(12) United States Patent
Hirata et al.

(10) Patent No.: US 7,640,663 B2
(45) Date of Patent: Jan. 5, 2010

(54) FILTER MEMBER PRODUCING METHOD

(75) Inventors: Yuichi Hirata, Nagoya (JP); Hironobu Suzuki, Nagoya (JP)

(73) Assignee: Chuo Hatsujo Kabushiki Kaisha, Nagoya-shi, Aichi-ken (JP)

( * ) Notice: Subject to any disclaimer, the term of this patent is extended or adjusted under 35 U.S.C. 154(b) by 782 days.

(21) Appl. No.: 10/542,537

(22) PCT Filed: Jan. 23, 2004

(86) PCT No.: PCT/JP2004/000634

§ 371 (c)(1),
(2), (4) Date: Jul. 18, 2005

(87) PCT Pub. No.: WO2004/064979

PCT Pub. Date: Aug. 5, 2004

(65) Prior Publication Data

US 2006/0112559 A1    Jun. 1, 2006

(30) Foreign Application Priority Data

Jan. 24, 2003   (JP)   ............................. 2003-016616

(51) Int. Cl.
*B23P 15/16* (2006.01)
(52) U.S. Cl. ............... 29/896.62; 29/896.6; 55/487; 228/5.1; 228/234.1
(58) Field of Classification Search .............. 29/896.62; 228/234.1, 5.1; 280/741; 55/487
See application file for complete search history.

(56) References Cited

U.S. PATENT DOCUMENTS

| 2,271,662 | A |   | 2/1942  | Rubissow |
|-----------|---|---|---------|----------|
| 3,920,170 | A | * | 11/1975 | Colburn et al. ............... 228/5.1 |
| 5,308,370 | A | * | 5/1994  | Kraft et al. .................... 55/487 |

FOREIGN PATENT DOCUMENTS

| DE | 2720278 A1  | 11/1978 |
| JP | 01-293112   | 11/1989 |
| JP | 05-253423   | 10/1993 |
| JP | 06-055991   | 3/1994  |
| JP | 09-226507   | 9/1997  |
| JP | 11-348712   | 12/1999 |
| JP | 2002-536152 | 8/2000  |

(Continued)

OTHER PUBLICATIONS

Supplementary European Search Report under Article 157(2)(a) issued on Mar. 21, 2007, for Application No. 04704770.9-1213 PCT/JP2004/000634.

(Continued)

*Primary Examiner*—Rick K Chang
(74) *Attorney, Agent, or Firm*—Carstens & Cahoon LLP

(57) ABSTRACT

A method for fabricating a filtering member in which overlapping portions of a wire are bonded together in a layered manner through thermal treatment for forming a mesh is disclosed. In accordance with the method, a contact surface pressure between portions of the wire to be bonded together is maintained as equal to or higher than a predetermined level set depending on a thermal treatment condition. In this state, the thermal treatment is conducted such that a bonding portion of the wire has a strength equal to or greater than 4N.

10 Claims, 3 Drawing Sheets

FOREIGN PATENT DOCUMENTS

| | | |
|---|---|---|
| JP | 2001-29717 | 2/2001 |
| JP | 2001-171472 | 6/2001 |
| JP | 2002-306914 | 10/2002 |
| WO | PCT/JP2004/000634 | 1/2004 |
| WO | WO 2004/064979 A1 | 8/2004 |

OTHER PUBLICATIONS

Japan Powder Metallurgy Association, "General Remarks on Powder Metallurgy, Sintering Mechanism," Nikkan Kogyo Shinbunsha, Mar. 25, 1964, p. 138-141.

* cited by examiner

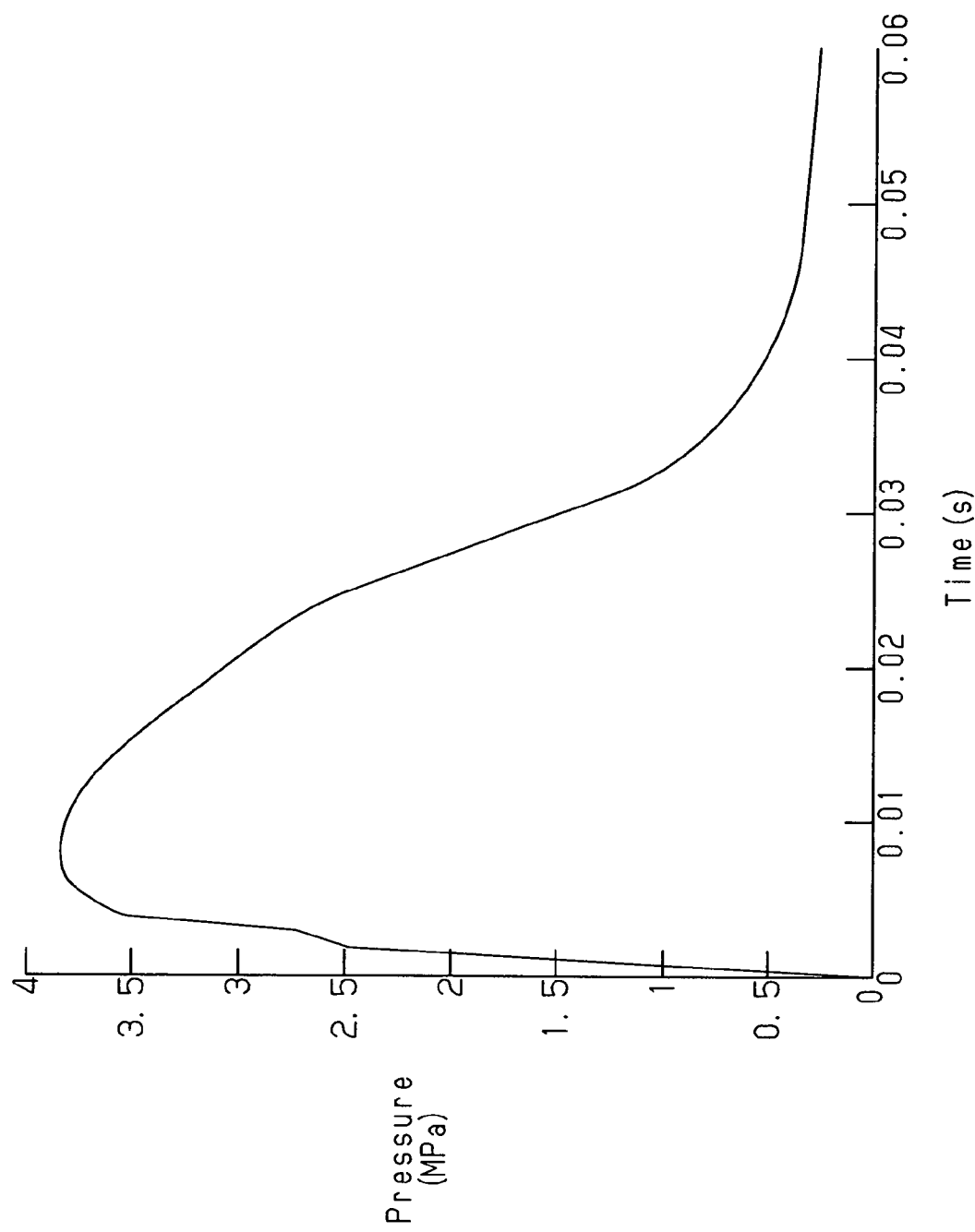

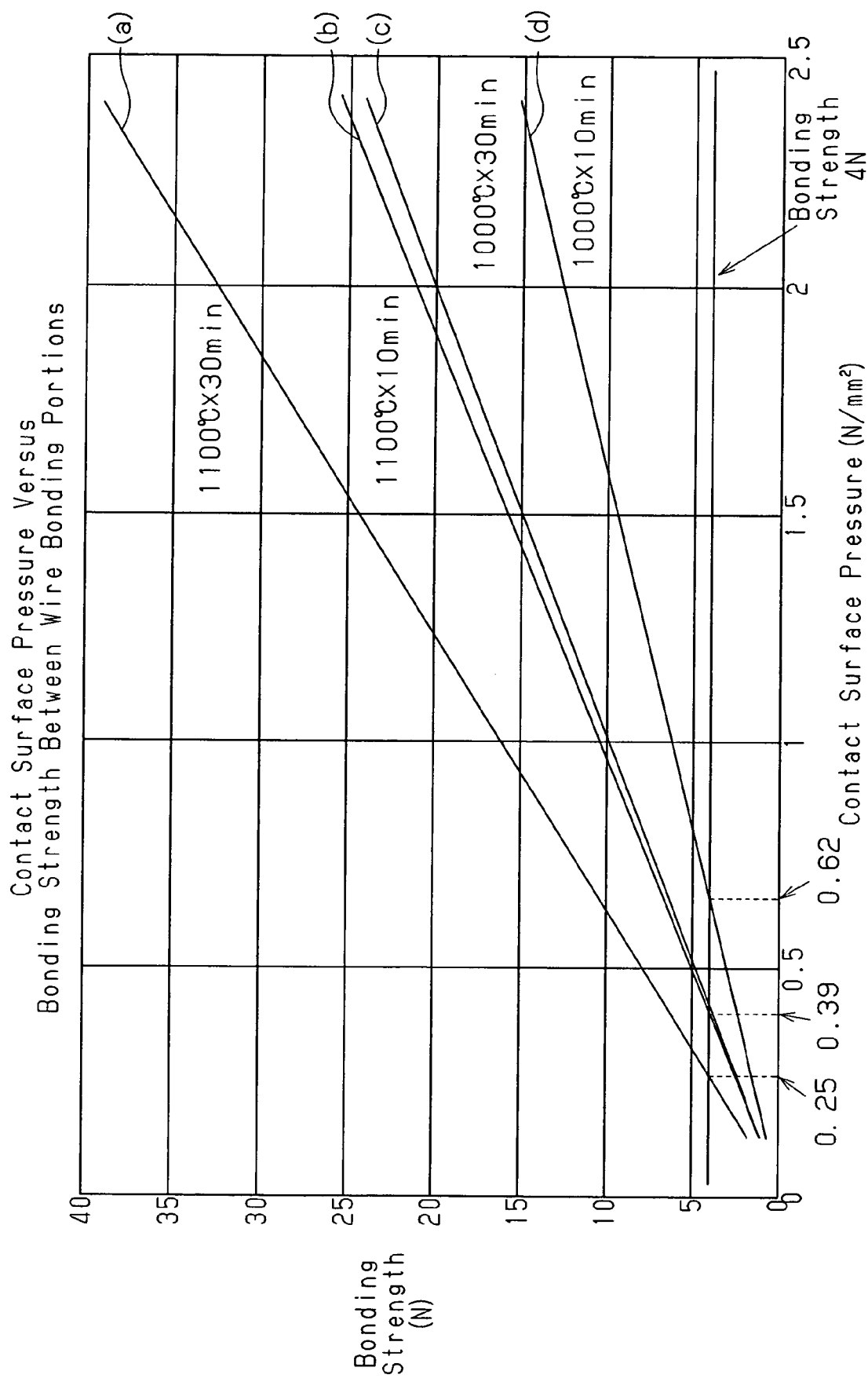

FILTER MEMBER PRODUCING METHOD

FIELD OF THE INVENTION

The present invention relates to fabrication methods for a filtering member in which a wire arranged in a layered manner is bonded integrally for forming a mesh, such as a coil type filter, which is, for example, a filter used in an airbag inflator.

BACKGROUND OF THE INVENTION

Conventionally, a vehicle is provided with an airbag device, which inflates a bag by quickly supplying gas when a rapid deceleration occurs due to, for example, a car crash. The airbag device includes an inflator for quickly supplying gas when the device is activated and a bag inflated by the gas from the inflator for protecting passengers. The inflator incorporates an igniter, a gas generating agent burned in an explosive-like manner by the heat generated by the igniter, and a filter. The filter collects and cools solid or liquid residue contained in hot gas generated through combustion of the gas generating agent. The filter is configured normally by a coil type filter, which is formed by winding a circular wire or a deformed wire, such as a square wire, formed of metal (hereinafter, referred to as "a wire") in a layered manner for defining a meshed cylindrical body. When gas or liquid passes through the mesh defined by the wire, the substance is cooled and filtered by the coil type filter such that a residue is recovered.

After winding the wire of this type of filter, overlapping portions of the wire are bonded together by, normally, thermal treatment (sintering). In this manner, the filtration performance of the filter is maintained by preventing the mesh from being deformed due to expansion of the wire or an impact caused by the gas passing through the mesh.

Particularly, a filter serving as a filtering member for an airbag is exposed to extremely hot gas. It is thus necessary to employ a bonding method that ensures a relatively high bonding strength. Therefore, for improving the bonding strength, it has been proposed that the sintering be conducted at a higher temperature, or for a prolonged time, or in a modified atmosphere (see Japanese Laid-Open Patent Publication No. 2001-171472).

However, in accordance with the fabrication method for a filter for an airbag inflator described in the aforementioned publication, it is necessary to modify the corresponding equipment for obtaining a higher sintering temperature or changing the sintering atmosphere. Such modification requires a relatively large cost, thus increasing the manufacturing cost. Further, the prolonged processing time decreases productivity.

Accordingly, in order to solve the aforementioned problems of the prior art, it is an objective of the present invention to provide a fabrication method for a filtering member by which the bonding strength of a wire forming a mesh is improved with relatively low cost and relatively high efficiency.

SUMMARY OF THE INVENTION

In order to solve the aforementioned problem, an embodiment of the present invention provides a method for fabricating a filtering member in which overlapping portions of a wire are bonded together in a layered manner through thermal treatment for forming a mesh. In accordance with the method, a contact surface pressure between portions of the wire to be bonded together is maintained as equal to or higher than a predetermined level set depending on a thermal treatment condition. In this state, the thermal treatment is conducted such that a bonding portion of the wire has a strength equal to or greater than 4 N (4 Newtons).

It is desirable that, when a thermal treatment temperature and a thermal treatment time are specified as the thermal treatment condition, the thermal treatment is performed such that the following inequality is satisfied:

$$4 \leq C1 \times \exp(-C2/T) \times (t/T)^{0.4} \times P \times b^2 \times n$$

T: thermal treatment temperature, t: thermal treatment time, P: contact surface pressure, b: lateral contact dimension between contact portions of the wire, n: number of bonding portions of the wire;

C1, C2 are coefficients; C1=4,105, C2=9,000.

It is desirable that the filtering member be a coil type filter in which the wire is wound in a layered manner for forming a mesh and that the contact surface pressure be reliably produced by tension applied to the wire during winding of the wire.

It is desirable that a winding end of the wire be fixed while maintaining the tension applied to the wire during winding of the wire in a state acting on the wire. It is also desirable that the contact surface pressure be adjusted by changing the tension applied to the wire during winding of the wire.

BRIEF DESCRIPTION OF THE DRAWINGS

FIG. 3 is a graph showing variation of the pressure generated in a chamber as time elapses; and FIG. 4 is a graph showing contact surface pressure versus bonding strength between bonding portions of a wire.

DESCRIPTION OF THE PREFERRED EMBODIMENTS

A fabrication method for an airbag inflator filter (a filtering member) incorporated in an inflator of an airbag device according to one embodiment of the present invention will now be described with reference to FIGS. 1 to 4.

Figure 1:
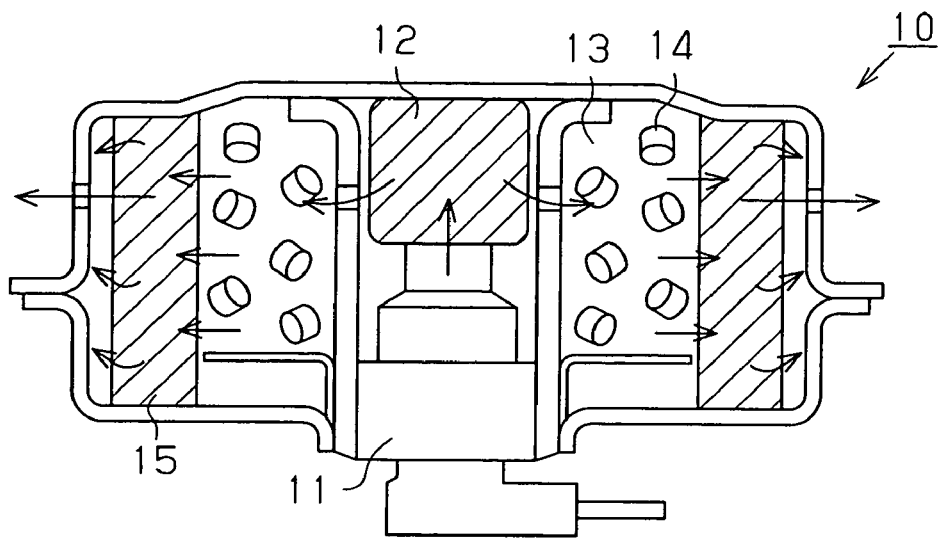
FIG. 1 is a cross-sectional view showing an inflator.

As shown in FIG. 1, in the illustrated embodiment, a detonator 11 and a burnable igniter 12 are installed in a middle portion of an inflator 10 of the airbag device. The detonator 11 is activated in response to an activation signal from a sensor (not shown). A chamber portion 13 is defined around the outer circumference of the detonator 11 and that of the igniter 12. The chamber portion 13 receives the heat generated through activation of the detonator 11 and resulting combustion of the igniter 12. A gas generating agent 14 is installed in the chamber portion 13. The gas generating agent 14 generates a relatively large amount of gas when burned in an explosion-like manner by the heat generated through the activation of the detonator 11 and the combustion of the igniter 12. The generated gas is then supplied to a bag (not shown) of the airbag device.

A filter 15 is arranged in the inflator 10 and encompasses the chamber portion 13. The filter 15 functions as a cooling member for cooling the hot gas generated through combustion of the gas generating agent 14 and supplying the gas and as a filtering member for recovering solid residue contained in the gas.

Figure 2A:
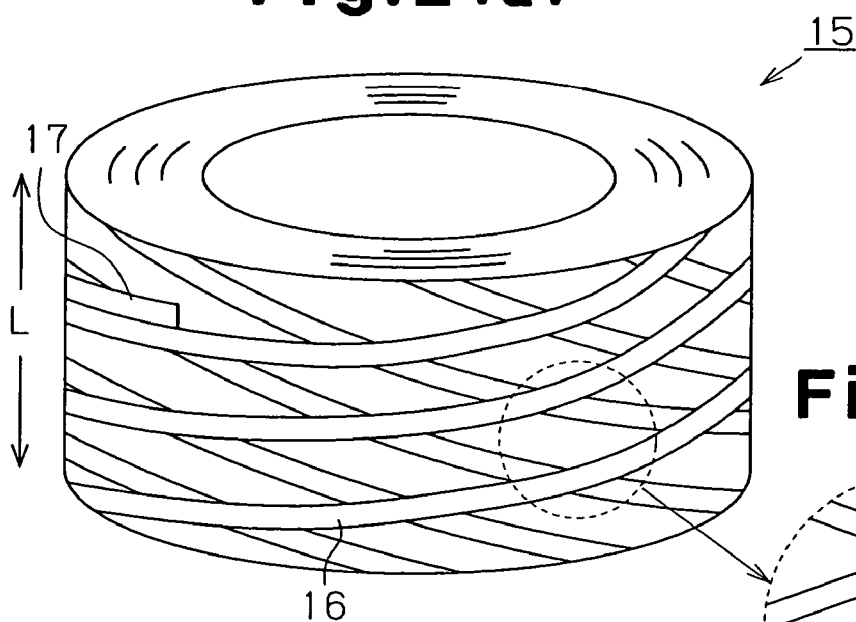
FIG. 2(a) is a perspective view showing a filter.
Figure 2B:
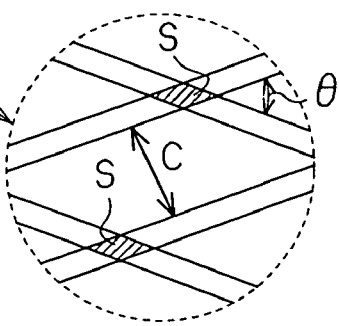
FIG. 2(b) is an enlarged view showing a portion of the filter.

With reference to FIGS. 2(a) and 2(b), in order to fabricate the filter 15, a circular wire or a deformed wire, such as a square wire, formed of metal (hereinafter, referred to as "a wire") 16 is wound around a cylindrical bobbin (not shown) for defining a mesh. The bobbin is then removed such that the filter 15 is shaped like a hollow cylinder. In the filter 15 of the illustrated embodiment, a wire material formed mainly of iron (having a cross-sectional area of 0.2 mm$^2$) is employed as the wire 16. The wire 16 is wound around the outer circumferential surface of the bobbin for 500 cycles, thus defining a mesh. The filter 15 has a hollow cylindrical shape with an outer diameter of $\phi$60 mm and an inner diameter of $\phi$50 mm.

Accordingly, when a relatively large amount of hot gas passes through the gaps of the mesh formed by the wire 16, the filter 15 is allowed to cool the gas and recover solid residue contained in the gas. Further, in the illustrated embodiment, the winding pitch of the wire 16 is defined as a pitch C, the angle between the crossing portions of the wire 16 is defined as a crossing angle θ, the dimension of the wire 16 in the bobbin axial direction is defined as a winding dimension L, and the crossing portions of the wire 16 are referred to as a contact portion S, referring to FIGS. 2(*a*) and 2(*b*).

The fabrication method for the filter 15 will be explained in detail as follows. First, the wire 16 is wound around the outer circumferential surface of the bobbin in a crisscross manner, with a predetermined level of tension applied to the wire 16, such that a mesh is formed by the wire 16. The wire 16 may be wound around the bobbin by moving the wire 16 in the axial direction of the bobbin or moving the shaft of the bobbin in the bobbin's axial direction. Regarding the filter 15, the pitch C, the winding dimension L, the crossing angle θ of the wire 16 are obtained through computer simulation. The filter 15 is thus fabricated in accordance with the optimal values of these parameters. In this manner, the mesh pattern or the winding density are set as desired, such that various types of meshes may be formed depending on different requirements for the filtering function.

When winding of the wire 16 is completed, a winding end 17 of the wire 16 is joined (bonded) with an adjacent winding portion through welding or the like, with the tension continuously applied to the wire 16. The bobbin is then removed from the wire 16, thus producing an unfinished, hollow cylindrical filter that has yet to be thermally treated. Subsequently, for bonding the contact portions S of the wire 16, the wire 16 is thermally treated and sintered, such that a coil type filter 15 shaped as shown in FIG. 2(*a*) is completed.

If the filter 15 is used as a filtering member for an airbag, the filter 15 is exposed to extremely hot gas (at approximately 2,200 degrees Celsius). It is thus necessary to bond the contact portions S together with a relatively high bonding strength. Accordingly, for meeting such necessity, certain conditions are set in fabrication of the filter 15 in accordance with the illustrated embodiment. These conditions will be explained as follows.

FIG. 3 is a graph representing the pressure variation in the chamber portion 13 in the inflator 10 as time elapses when the airbag is actuated. The graph of FIG. 3 indicates that the pressure in the chamber portion 13 reaches a maximum level, approximately 4 MPa, immediately after actuation of the airbag. Since the filter 15 is arranged in the chamber portion 13, the bonding strength of the contact portions S of the filter 15 must be sufficiently high for tolerating the pressure of approximately 4 MPa.

By the following equation (1), a tension σ applied to a single section of a wire of a coil type filter formed by winding a wire such as a metal line around the outer circumferential surface of a cylindrical bobbin, like the filter 15, is determined:

$$\sigma = \gamma_2^2 P1/(\gamma_1^2 - \gamma_2^2) \times (\gamma_1^2/\gamma^2 + 1) \times Z \tag{1}$$

In this equation, σ represents the tension applied to the single wire section, P1 represents the interior pressure acting on the filter, $\gamma_1$ is the outer diameter of the filter, $\gamma_2$ is the inner diameter of the filter, γ is the radius of the filter ($\gamma_2 \leq \gamma \leq \gamma_1$), and Z represents the cross-sectional area of the wire.

It can be considered that the equation (1) represents the tension applied to a single section of the wire 16 when the gas generating agent 14 is burned. Thus, by applying the values representing the specification of the filter 15 (the wire cross-sectional area: 0.2 mm$^2$, the number of winding cycles: 500, the outer diameter: ($\phi$60, the inner diameter: ($\phi$50) to the equation (1), a value σ substantially equal to 4 N is obtained. It is thus understood that a load of about 4 N acts on the single section of the wire 16 of the filter 15 as the tension, when the airbag is actuated.

Therefore, in order to prevent the bonding of the different sections of the wire 16 from loosening when the airbag is actuated, the bonding strength must be sufficiently high for producing resistance against a load of about 4 N. In other words, it is required that sintering be performed while the contact surface pressure of each of the contact portions S is maintained as equal to or higher than a predetermined level corresponding to sintering conditions, such that the bonding strength of the bonding portions of the wire 16, which defines the mesh, is equal to or higher than 4 N.

As is broadly known, sintering of a metal line, which corresponds to the wire 16, is brought about by diffusion of atoms configuring the metal line toward a bonding point. The following equation (2) representing sintering through internal diffusion is thus selected:

$$x^5/a^2 = 10\gamma V D_v t / RT \tag{2}$$

In this equation, x represents the radius of a substantially circular contact surface formed through sintering of the metal line or a half of the lateral dimension of a strip-like contact surface if the contact surface obtained through sintering is developed in a strip-like shape, a represents the radius of the metal line, γ represents the surface tension of the metal line, V represents the volume of 1 mol of the metal line, $D_V$ represents the diffusion coefficient in sintering, t represents the sintering time, R represents the gas constant (1.987 cal/degree), and T represents the sintering temperature (the absolute temperature). The equation (2) was obtained with reference to pages 138 to 141 of "General Remarks on Powder Metallurgy•Sintering Mechanism" (published by Nikkan Kogyo Shinbunsha, Mar. 25, 1964).

Further, by conducting tests, the following equation (3) related to the bonding strength F, the sintering temperature T, the sintering time t, the contact surface pressure P between the bonded sections of the wire 16, the lateral contact dimension between the contact portions S of the wire 16, and the number n of the bonding portions of the wire 16 was obtained:

$$F = C1 \exp(-C2/T) \times (t/T)^{0.4} \times P \times b^2 \times n \tag{3}$$

In this equation, C1 and C2 each represent a coefficient and satisfy the following: C1=4105, C2=9000.

The coefficients C1, C2 are determined based on the assumption that the squared value of x (the radius of the contact surface and the like) of the equation (2) corresponds to the bonding area (or the bonding strength) brought about through sintering of the contact portions S of the filter 15, in accordance with the graph of FIG. 4 representing the relationship between the bonding strength between the bonding portions of the wire 16 and the contact surface pressure between the bonding portions of the wire 16.

The graph of FIG. 4 shows the results of the test that has been conducted for determining the relationship between the contact surface pressure and the bonding strength between the bonding portions of the wire 16, representing the relationship between the bonding strength between the bonding portions of the wire 16 and the contact surface pressure between the bonding portions of the wire 16 in accordance with sintering conditions (temperature×time) when the number n of the bonding portion of the wire 16 corresponds to one. More specifically, in the graph, the relationship between the bonding strength between the bonding portions of the wire 16 and the contact surface pressure between the bonding portions of the wire 16 in accordance with a first sintering condition (1,100 degrees Celsius×30 minutes) is represented by the solid line (a) and such relationship in accordance with a second sintering condition (1,100 degrees Celsius×10 minutes) is represented by the solid line (b). Further, the relationship between the bonding strength between the bonding portions of the wire 16 and the contact surface pressure between the bonding portions of the wire 16 in accordance with a third sintering condition (1,000 degrees Celsius×30 minutes) is represented by the solid line (c) and such relationship in accordance with a fourth sintering condition (1,000 degrees Celsius×10 minutes) is represented by the solid line (d).

Since the bonding strength F between the bonding portions of the wire 16 of the filter 15 must be equal to or higher than 4 N for reaching a sufficient level, the filter 15 should be fabricated such that the condition represented by the following equation (4), which is obtained from the test equation (3), is satisfied:

$$4 \leq C1 \times \exp(-C2/T) \times (t/T)^{0.4} \times P \times b^2 \times n \qquad (4)$$

Regarding the equation (4), T, t, P, b, n, C1, and C2 are defined in the same manner as those of the equation (3).

Based on the equation (4) and FIG. 4, the following is understood. That is, in the case of the first sintering condition (1,100 degrees Celsius×30 minutes) of FIG. 4, a filter 15 having a bonding strength F equal to or higher than 4 N is obtained by setting the contact surface pressure to 0.25 N/mm² or higher. If the contact surface pressure is set to 0.39 N/mm² or higher, a filter 15 having a bonding strength F equal to or higher than 4 N can be obtained while improving productivity, as in the case of the second sintering condition (1,100 degrees Celsius×10 minutes). Likewise, if the contact surface pressure is set to 0.39 N/mm² or higher, a filter 15 having a bonding strength F equal to or higher than 4 N can be obtained at a sintering temperature lower than that of the first sintering condition, as in the case of the third sintering condition (1,000 degrees Celsius×30 minutes).

Further, if the contact surface pressure is set to 0.62 N/mm² or higher, a filter 15 having a bonding strength F equal to or higher than 4 N can be obtained at a relatively low sintering temperature with improved productivity, as in the case of the fourth sintering condition (1,000 degrees Celsius×10 minutes).

Accordingly, in a filter 15 in which the overlapping portions (the contact portions S) of the wire 16 are bonded together through sintering in a layered manner for defining a mesh, it is indicated that the level of the surface pressure (the contact surface pressure) between the bonding portions of the wire 16, as well as the sintering conditions including the sintering temperature, is an important factor for determining the bonding strength. For applying the contact surface pressure to each of the contact portions S, a tapered jig may be inserted into the hollow shaft portion of the filter 15 when sintering is performed such that the crossing portions of the wire 16 are held in contact as pressed together. However, in a coil type filter formed by winding the wire 16 around a bobbin, such as the filter 15 of the illustrated embodiment, the contact surface pressure can be produced by the tension applied to the wire 16 during winding. The contact surface pressure is thus ensured relatively easily.

The following equation (5) represents the relationship between the contact surface pressure between the bonding portions of the wire 16 and the tension in the case of the illustrated embodiment.

$$P = \sigma/(r \times b) \qquad (5)$$

In the equation (5), P represents the contact surface pressure (N/mm²) between the wire bonding portions, σ represents the tension (N) acting on a single section of the wire 16, r represents the winding radius (mm) of the wire 16, and b represents the lateral contact dimension (mm) between the bonding portions of the wire 16.

As is understood from the equation (5), if a coil type filter 15 is fabricated with tension applied to the wire 16, the tension applied to the wire 16 during winding is a factor related to the contact surface pressure of the contact portions S. In other words, as the tension σ applied during winding becomes larger, the contact surface pressure P becomes higher. In contrast, as the tension σ applied during winding becomes smaller, the contact surface pressure P becomes lower. For example, if it is required that the contact surface pressure between the bonding portions of the wire 16 is set to 0.62 N/mm² or higher, the tension σ obtained by the equation (5) is 9.61 N when the lateral contact dimension b is 0.5 mm and the winding radius r is 31 mm. However, since the actual process temperature is extremely high, the tension σ as a whole cannot act as the contact surface pressure. Also, the actual number n of the bonding portions of the wire 16 cannot be one. With these conditions considered, it is known that the actually obtained effect corresponds to at least 60% of the computed value. Thus, by setting the tension a applied to the wire 16 during winding to 16 N or larger, the contact surface pressure at each of the contact portions S of the wire 16 can be set to 0.62 N/mm² or higher.

Further, if the tension applied to the wire 16 during winding of the wire 16 is changed in accordance with the equation (5) when the filter 15 is fabricated as a filtering member, it is indicated that the contact surface pressure, which is an important factor for determining the bonding strength, is adjusted. The filter 15 having a different bonding strength is thus obtained. Also, such contact surface pressure caused in correspondence with the tension applied to the wire 16 during winding is maintained by fixing the winding end 17 of the wire 16 to a different portion of the filter 15 (for example, an intermediate section of the wire 16) through welding or swaging, with the tension applied to the wire 16 during winding maintained in a non-released state.

The illustrated embodiment has the following advantages.

(1) In the illustrated embodiment, for setting the bonding strength of the bonding portions of the wire 16, which defines a mesh, to 4 N or greater, sintering is performed with the contact surface pressure between the bonding portions of the wire 16, or at each of the contact portions S, maintained as equal to or higher than a predetermined level set depending on the sintering conditions. Thus, regardless of the relatively high pressure and high temperature caused by actuation of the airbag, the bonding portions of the wire 16 at the contact portions S are maintained without loosening. Accordingly, a relatively high bonding strength is ensured in the filter 15 with relatively low cost and improved efficiency.

(2) In the fabrication method of the filter 15 of the illustrated embodiment, regarding the sintering process, the relationship among numerals including the sintering temperature, the sintering time, the contact surface pressure between the bonding portions of the wire 16, the lateral contact dimension between the bonding portions of the wire 16, and the number of the bonding portions of the wire 16 is set such that the condition of the predetermined equation (4) is satisfied. In other words, in order to set the bonding strength between the bonding portions of the wire 16 to a value equal to or higher than a certain value (4 N), the filter 15 is fabricated in such a manner as to satisfy the condition represented by the equation (4), which represents the relationship among the sintering temperature and sintering time of the filter 15, the contact surface pressure between the bonding portions of the wire 16, the lateral contact dimension between the bonding portions of the wire 16, and the number of the bonding portions of the wire 16. Accordingly, the filter 15 is configured to reliably tolerate the gas pressure produced by actuation of the airbag. Further, by optimizing the various conditions (T: sintering temperature, t: sintering time, P: contact surface pressure between the wire bonding portions, b: lateral contact dimension between the wire bonding portions, and n: number of the wire bonding portions), the process conditions that are suitable for the performance of production equipment and capable of maximally improving productivity can be selected for fabricating the filter 15.

(3) In the illustrated embodiment, tension is applied to the wire 16 when the wire 16 is wound. A sufficient contact surface pressure is thus ensured at each of the contact portions S at which the corresponding sections of the wire 16 cross each other, when the filter 15 is fabricated. That is, in fabrication of the filter 15, the necessary contact surface pressure, which is an important factor for determining the bonding strength between the bonding portions of the wire 16, is obtained easily and reliably.

(4) In the illustrated embodiment, the winding end 17 of the wire 16 is fixed (bonded) through welding or the like with the tension maintained as applied to the wire 16, in fabrication of the filter 15. Such fabrication is thus completed with the contact surface pressure maintained at a required sufficient level during sintering.

(5) When a filter 15 is fabricated as the filtering member in the illustrated embodiment, the tension applied to the wire 16 during winding is changed in correspondence with the predetermined equation (5), such that the contact surface pressure is adjusted. It is thus possible to easily optimize the contact surface pressure, which is varied in accordance with changes in the sintering conditions.

The illustrated embodiment may be modified as follows.

In the illustrated embodiment, a line formed mainly of iron (having a cross-sectional area of 0.2 mm$^2$) is employed as the wire 16. The wire 16 is wound around the bobbin for 500 cycles for forming a hollow cylindrical coil type filter 15 with an outer diameter of ϕ60 and an inner diameter of ϕ50. However, the material or the dimensions of the filter 15 may be selected as needed in accordance with the shape or the dimensions of the inflator 10, in which the filter 15 is installed.

In the filter 15 of the illustrated embodiment, the mesh is formed by winding the wire 16, the metal square or circular line, around the shaft of the bobbin. However, the mesh of the filter 15 may be formed in different suitable manners modified from that of the embodiment. For example, the filter 15 may include a knitted mesh such as a stockinet type mesh. Alternatively, the mesh of the filter 15 may be formed by winding a flat-woven mesh in an overlapping manner.

In the illustrated embodiment, the contact surface pressure acting on each of the contact portions S between the bonded portions of the wire 16 of the filter 15 is produced by the tension applied to the wire 16 during winding of the wire 16. However, such contact surface pressure may be generated using a tapered jig or the like, when sintering is conducted.

In the illustrated embodiment, the overlapping portions of the wire 16, which are arranged in a layered manner, are bonded together though sintering. However, bonding of the wire 16 may be brought about by different suitable methods other than the sintering. For example, the overlapping portions of the wire 16 may be bonded together through high-frequency induction heating.

The invention claimed is:

1. A method for fabricating a filtering member in which, after winding a wire, overlapping portions of the wire are bonded together in a layered manner through sintering for forming a mesh, the method comprising:
    applying a contact surface pressure between portions of the wire to be bonded together; and
    maintaining the contact surface pressure as equal to or higher than a predetermined level that is set in accordance with a sintering condition, and conducting the sintering in this state, such that each bonding portion of the wire in a final product has a bonding strength equal to or greater than 4 N, wherein the sintering condition is determined in accordance with contact surface pressure lateral contact dimension between contact portions of the wire, and number of bonding portions of the wire.

2. The method according to claim 1, wherein, when a thermal treatment temperature and a thermal treatment time are specified as the sintering condition, the thermal treatment is performed such that the following inequality is satisfied:

$$4 \leq C1 \times \exp(-C2/T) \times (t/T)^{0.4} \times P \times b^2 \times n$$

in which:
    T: thermal treatment temperature, t: thermal treatment time, P: the contact surface pressure, b: the lateral contact dimension between contact portions of the wire, n: the number of bonding portions of the wire, and
    wherein C1 and C2 are coefficients, with C1=4,105, and C2=9,000.

3. The method according to claim 1, wherein:
    the filtering member is a coil type filter in which the wire is wound in a layered manner for forming a mesh, and the contact surface pressure is produced by tension applied to the wire during winding of the wire.

4. The method according to claim 3, wherein a winding end of the wire is fixed while the tension is applied to the wire during winding of the wire.

5. The method according to claim 3, wherein the contact surface pressure is adjusted by changing the tension applied to the wire during winding of the wire.

6. A method for fabricating a filter for an airbag inflator in which, after winding a metal wire, overlapping portions of the metal wire are bonded together in a layered manner through sintering for forming a mesh, the method comprising:
    applying a contact surface pressure between portions of the wire to be bonded together; and
    maintaining the contact pressure as equal to or higher than a predetermined level that is set in accordance with a sintering condition, and conducting the sintering in this state, such that each bonding portion of the wire in a final product has a bonding strength equal to or greater than 4 N, wherein the sintering condition is determined in accordance with contact surface pressure lateral contact dimension between contact portions of the wire, and number of bonding portions of the wire.

7. The method according to claim 6, wherein, when a thermal treatment temperature and a thermal treatment time are specified as the sintering condition, the sintering is performed such that the following inequality is satisfied:

$$4 \leq C1 \times \exp(-C2/T) \times (t/T)^{0.4} \times P \times b^2 \times n$$

in which:
T: thermal treatment temperature, t: thermal treatment time, P: contact surface pressure, b: lateral contact dimension between contact portions of the wire, n: number of bonding portions of the wire, and C1 and C2 are coefficients, with C1=4,105, and C2=9,000.

8. The method according to claim 6, wherein the filter is a coil type filter in which the wire is wound in a layered manner for forming a mesh, and the contact surface pressure is produced by tension applied to the wire during winding of the wire.

9. The method according to claim 8, wherein a winding end of the wire is fixed while the tension is applied to the wire during winding of the wire.

10. The method according to claim 8, wherein the contact surface pressure is adjusted by changing the tension applied to the wire during winding of the wire.

* * * * *